US006471348B1

(12) United States Patent
Koitabashi

(10) Patent No.: US 6,471,348 B1
(45) Date of Patent: Oct. 29, 2002

(54) INK PRINTING METHOD AND INK PRINTER

(75) Inventor: Noribumi Koitabashi, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/469,304

(22) Filed: Dec. 22, 1999

(30) Foreign Application Priority Data

Dec. 25, 1998 (JP) .......................................... 10-376678

(51) Int. Cl.[7] ................................................ G01D 11/00
(52) U.S. Cl. .......................... 347/100; 347/101; 347/96
(58) Field of Search ........................... 347/100, 96, 101

(56) References Cited

U.S. PATENT DOCUMENTS 6,007,182 A 12/1999 Matsubara et al. ........... 347/43
6,074,052 A * 6/2000 Inui et al. .................... 347/101

FOREIGN PATENT DOCUMENTS

EP 0583096 A1 * 2/1994 ........... C09D/11/00

OTHER PUBLICATIONS

U.S. patent application Ser. No. 09/470,221, filed Dec. 22, 1999, pending.
U.S. patent application Ser. No. 09/469,514, filed Dec. 22, 1999, pending.
U.S. patent application Ser. No. 09/468,839, filed Dec. 22, 1999, pending.
U.S. patent application Ser. No. 09/468,117, filed Dec. 21, 1999, pending.
U.S. patent application Ser. No. 09/219,895, filed Dec. 24, 1998, pending.
U.S. patent application Ser. No. 09/217,940, filed Dec. 22, 1998, pending.
U.S. patent application Ser. No. 08/840,773, filed Apr. 16, 1997, pending.

* cited by examiner

*Primary Examiner*—John Barlow
*Assistant Examiner*—Manish S. Shah
(74) *Attorney, Agent, or Firm*—Fitzpatrick, Cella, Harper & Scinto

(57) ABSTRACT

There are used heads which eject a black (Bk) ink and processing liquid of relatively low penetrability, respectively, and heads which eject cyan (C), magenta (M) and yellow (Y) inks of high penetrability, also respectively. When monochromic characters or images are to be printed, the Bk ink and processing liquid are ejected in this order, and then the C, M and Y inks are ejected while being thinned out. When color images are to be printed, on the other hand, the processing liquid is ejected first, and the C, M or Y ink, depending on the color of the images to be printed, is ejected. This allows the processing liquid to react with the Bk or color ink, to realize high OD, and high-speed fixation by penetrability of the color ink.

33 Claims, 6 Drawing Sheets

INK PRINTING METHOD AND INK PRINTER

This application is based on Patent Application No. 10-376678 (1998) filed Dec. 25, 1998 in Japan, the content of which is incorporated hereinto by reference.

BACKGROUND OF THE INVENTION

1. Field of the Invention

The present invention relates to an ink printing method and an ink printing apparatus, and more particularly to an ink printing method and apparatus which perform printing by using a processing liquid insolubilizing a colorant in an ink. The ink printing method and apparatus of the present invention are applicable to equipment such as a printer, a copy machine, a facsimile machine or the like, that prints letters, images or the like on a printing medium such as paper or the like, and also applies to a printing mechanism of such equipment.

2. Description of the Prior Art

To improve density and fixability of a printed image has been an important focus in the ink-printing field. More specifically, ink printing has been required to provide printing density and fixation speed as high as those associated with electrophotography, which is another technique for printing. Under these circumstances, the above described problems are more complex in printing full-color images than in printing only black letters or monochromic images with a black ink.

Full-color printing uses relatively highly penetrative inks, e.g., cyan (C), magenta (M) and yellow (Y) inks, as one of the methods to prevent these color inks from running into each other at boundaries between them. This method prevents each of the inks from running along a printing medium surface. However, use of the highly penetrative ink may cause other types of problems, such as difficulty in securing the high density or optical density (hereinafter referred to as OD), resulting from accelerated penetration of a dye colorant in the ink deep into the printing medium. Penetration of the dye colorant deep into the medium may degrade properties related to strike-through OD, when the printing medium (e.g., common paper) is sufficiently thin. Strike-through OD is an OD value of the printed matter when it is viewed from a back side of the printing medium, where the property related to the strike-through OD is better when the OD value is lower.

In the same way as described above, running of a black (Bk) ink at the boundary with a color ink can be also solved by increasing its penetrability. However, a character (e.g., a letter) printed with a penetrative Bk ink may have unsatisfactory print quality with respect to OD and sharpness at an edge of the letter. Use of a Bk ink of lower penetrability for improving the above described character quality in preference to other print quality may cause problems, such as running of the Bk ink at the interface with a color ink and slow fixation.

One of methods for solving these problems related to OD and fixation is a method using a heating mechanism. However, this method requires a heating source, e.g., heater, that consumes much electric power and causes problems, e.g., increased cost.

The assignee of the present invention has variously proposed to use a processing liquid which insolubilizes colorants in inks for improving waterproofness, OD, and fixability of a printed matter.

However, no ink printing method developed so far gives high OD both for characters/monochromic images with a Bk ink and full-color images, while still allowing high-speed fixation of ink.

SUMMARY OF THE INVENTION

An object of the present invention is to provide an ink printing method and an ink printing apparatus which give high OD both for monochromic and color images and still allows high-speed fixation.

Another object of the present invention is to provide an ink printing method and an ink printing apparatus which reduces strike-through to a back side of a printing medium.

In a first aspect of the present invention, there is provided an ink printing method using at least three types of liquid droplets, comprising the steps of:

causing a first ink droplet containing a first colorant and a processing liquid droplet, which works to accelerate solidification of the first colorant, to mix and react with each other on the printing medium to form a secondary liquid that contains a non-ionic surfactant at a concentration below its critical micelle concentration (CMC) in water; and applying a second ink droplet onto the secondary liquid, the second ink droplet containing a second colorant and a non-ionic surfactant having a concentration of its CMC in water, or more.

In a second aspect of the present invention, there is provided an ink printing method using at least three types of liquid droplets, comprising the steps of:

causing a first ink droplet containing a first colorant and a processing liquid droplet, which works to accelerate solidification of the first colorant, to mix and react with each other on the printing medium to form a secondary liquid that has a Ka value below 5; and applying a second ink droplet onto the secondary liquid, the second ink droplet containing a second colorant and a non-ionic surfactant having a concentration of its CMC in water, or more.

In a third aspect of the present invention, there is provided an ink printing apparatus which uses a head ejecting at least three types of liquid droplets and ejects the liquid droplet from the head onto a printing medium to perform printing, the apparatus comprising:

first applying means for controlling ejection of the liquid from the head so as to cause a first ink droplet containing a first colorant and a processing liquid droplet, which works to accelerate solidification of the first colorant, to mix and react with each other on the printing medium to form a secondary liquid that contains a non-ionic surfactant having a concentration below its critical micelle concentration (CMC) in water; and second applying means for controlling ejection of the liquid from the head to apply a second ink droplet onto the secondary liquid, the second ink droplet containing a second colorant and a non-ionic surfactant having a concentration of its CMC of water, or more.

In a fourth aspect of the present invention, there is provided an ink printing apparatus which uses a head ejecting at least three types of liquid droplets and ejects the liquid droplet from the head onto a printing medium to perform printing, the apparatus comprising:

first applying means for controlling ejection of the liquid from the head so as to cause a first ink droplet, containing a first colorant and a processing liquid droplet which works to accelerate solidification of the first colorant, to mix and react with each other on the printing medium to form a secondary liquid that has a Ka value below 5; and second applying means for applying a second ink droplet onto the secondary liquid, the second ink droplet containing a second colorant and a non-ionic surfactant at a concentration of its CMC in water, or more.

According to the configuration described above, after the first ink droplet containing the first colorant and the processing liquid droplet are mixed to react on the printing medium to form the secondary liquid, the second ink droplet of high penetrability containing the second colorant is applied onto the secondary liquid. Thereby, the first colorant can be accelaratory (i.e., quickly) solidified on the surface of the printing medium in the presence of the processing liquid droplet and the first colorant becomes a large block, at the molecular level, on the printing medium. Since the second ink droplet of high penetrability is applied onto the block, an aqueous solvent for the ink can penetrate quickly, while leaving the colorant on the printing medium surface.

The above and other objects, effects, features and advantages of the present invention will become more apparent from the following description of embodiments thereof taken in conjunction with the accompanying drawings.

DESCRIPTION OF THE PREFERRED EMBODIMENTS

Figure 1:
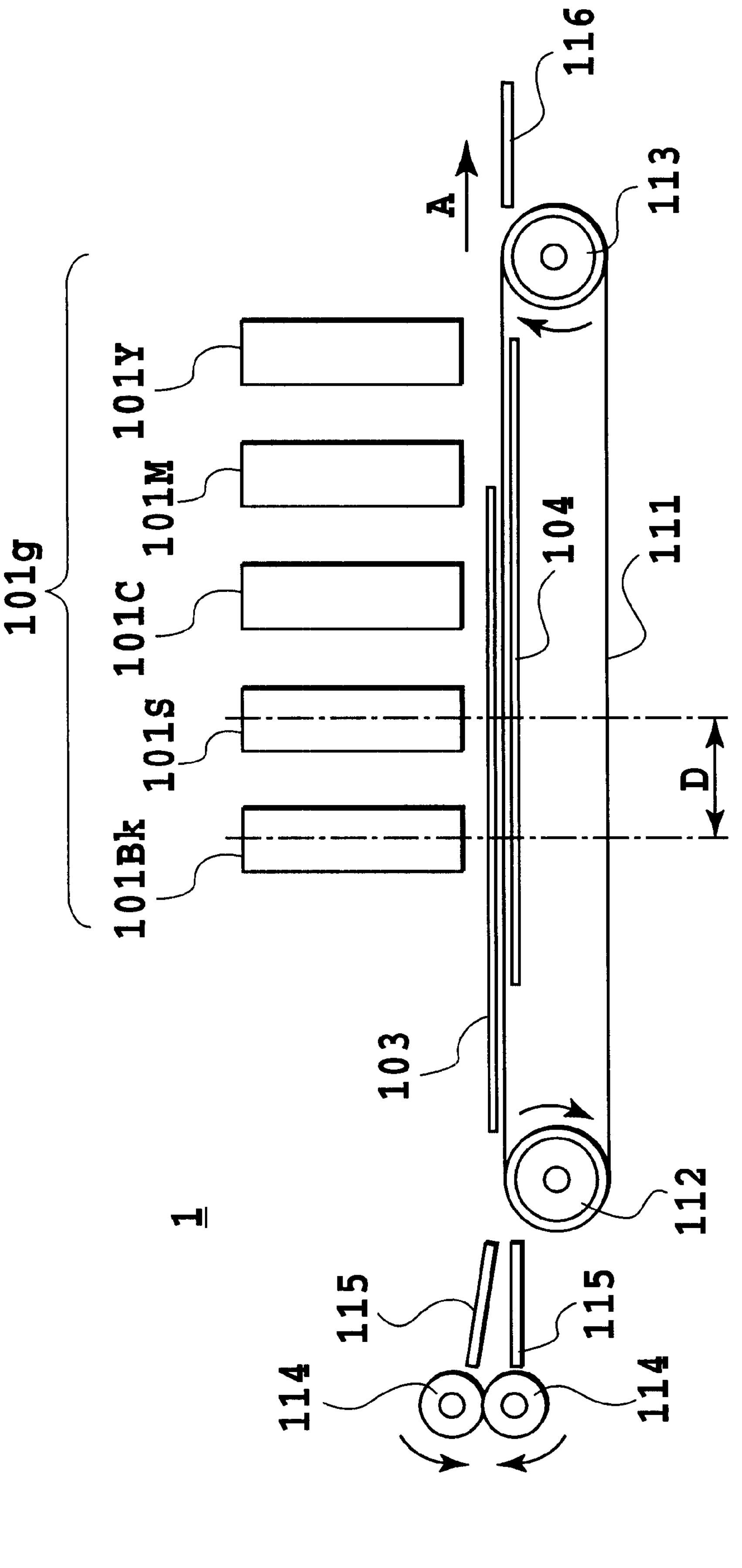
FIG. 1 is a side view generally showing a printer structure of one example of the present invention.

The preferred embodiments of the present invention will be described.

(Embodiment 1)

The present embodiment is directed to a printing system that applies a black (Bk) ink, a processing liquid (S), cyan (C), magenta (M) and yellow (Y) inks, in this order. In the configuration, the Bk ink and the processing liquid are of low penetrability or of a so-called up remaining types described later, whereas the C, M and Y inks are of high penetrability. The processing liquid is opposite in polarity to the Bk, C, M and Y inks, which allows each ink to react with the processing liquid to be accelaratory solidified.

When characters or images are printed with the Bk ink in the above-described system, one droplet is applied to one pixel, and then the processing liquid is applied to the droplet. Further, the C, M and Y inks are applied onto the above-described characters or images in a thinned out manner. Only one of these color inks need be used in this case, when each of them has very high penetrability.

When color images are to be printed, on the other hand, the processing liquid is first applied, followed by the C, M or Y ink, where one or more of these color inks are used depending on a color to be printed.

A phenomena involved in the fixation of the above-described monochromic or color image will be discussed below.

In this embodiment, as described above, the ink containing a colorant of Bk dye or pigment and the processing liquid which works to accelerate solidification of the ink colorant are applied on the printing medium, when monochromic characters or images are to be printed, to be mixed to react with each other in the liquid state. Then, at least one color ink of high penetrability, containing a colorant of, e.g., C, M or Y dye or pigment is applied onto the product of the above described reaction. The highly penetrative color ink contains a non-ionic surfactant having a concentration of its critical micelle concentration (hereinafter referred to as CMC) in water, or more.

According to the above described printing method, the colorant in the Bk ink is acceleratory solidified by the processing liquid in a shallow surface layer of the printing medium to become a large block, at the molecular level. Then, at least one color ink of high penetrability, subsequently applied, helps an aqueous solvent for the Bk ink to quickly penetrate into the printing medium while leaving the blocks in the shallow surface layer of the printing medium. Thereby, the black image of high density can be printed at a high fixation speed.

When color images are to be printed by the above described printing system, on the other hand, the processing liquid is first applied to the printing medium, and then one or more of the highly penetrative C, M and Y inks, depending on the color to be printed, are applied on the processing liquid. Thereby, the processing liquid reacts with one or more color inks, as is the case with fixation of the Bk ink, helping the aqueous ink solvent(s) to quickly penetrate while leaving one or more colorant(s) in the shallow surface layer of the printing medium. As a result, when printing full-color images, the density of the color images can be increased and high speed fixation can be realized.

In the above configuration, the penetrative Y, M and C color inks contain a non-ionic surfactant so that the mixture of the color ink and the processing liquid contains the surfactant preferably at a concentration of at least its CMC in water. This improves fixation when the color ink is applied to the processing liquid.

Further, when monochromic characters or images are to be printed, the penetrative ink is preferably thinned out as described above, when applied onto the secondary liquid, although to do so is not necessary. Thereby, visibility of the color ink colorant can be reduced, and a color of the color ink does not become noise to (i.e., detract from) the Bk ink colorant printed before.

This embodiment is directed to a printing system that applies Bk ink, a processing liquid (S), C, M and Y inks, and further light cyan (C'), light magenta (M') and light yellow (Y') inks which are lighter in density than the respective C, M and Y inks, in this order. The processing liquid and the C, M and Y inks are up remaining type ink of low penetrability, whereas the C', M' and Y' inks are of high penetrability which is similar to that described in Embodiment 1. The processing liquid S is opposite in polarity to the Bk, C, M, Y, C', M' and Y' inks, thereby, each ink can react with the processing liquid to be acceleratory solidified.

When monochromatic characters or images are to be printed by the above described printing system, the Bk ink, processing liquid S, and C', M' and Y' inks are applied in this order, where application of the respective C', M' and Y' inks is thinned out. In the printing system using no Y' ink, the Y ink may be used instead of the Y' ink, where the Y ink is applied before the C' and M' inks.

In the system using no Y' ink, the Y ink may be used instead and is preferably of high penetrability. For printing respective light cyan, magenta or yellow color images, the C', M'or Y' inks are applied, respectively after the processing liquid S.

On the other hand, when color images, e. g. respective cyan, magenta, yellow color images are to be printed, respective combinations (S, C, C'), (S, M, M') and (S, Y, Y') are used and in each combination, the processing liquids and inks are applied in the above described order. For printing other secondary colors, an ink combination selected from combinations (C, C'), (M, M') and (Y, Y') according to a color of image to be printed is used to be applied after the processing liquid S.

According to the second embodiment described above, when monochromic characters or images are to be printed, the Bk ink of low penetrability is applied first and then the processing liquid of low penetrability also is applied onto the printing medium to allow them to strongly react with each other. Subsequently, the highly penetrative C', M' and Y' inks are applied, while their application is thinned out, to realize relatively high-speed fixation, as discussed in Embodiment 1. Further, when color images are to be printed, on the other hand, the printing system applies the processing liquid of low penetrability, and then applies one or more of the C, M and Y inks, also of low penetrability, according to a color of image to be printed, to accelerate solidification of the ink(s) on a portion near a surface of the printing medium. Then, the system applies one or more of the C', M' and Y' inks of high penetrability according to the color to be printed to accelerate fixation of the ink(s). As discussed above, this embodiment also gives images of high quality (e.g., high in image density and sharp at the edge of the printed image) at a high fixation speed.

This embodiment is directed to a modified example of Embodiment 1, where the processing liquid S, and Bk, C, M and Y inks are applied in this order.

When monochromic characters or images are to be printed, the processing liquid S is applied and then the Bk ink is applied. Then the C, M and Y inks are applied while their application is thinned out. Color images are printed by the same procedure as that for Embodiment 1.

(Embodiment 4)

This embodiment is directed to a modified example of Embodiment 2, where an order of applying the processing liquid S and Bk ink is the reverse of that in Embodiment 2. In other words, the printing system of this embodiment applies the processing liquid S, and Bk, C, M, Y, C', M' and Y' inks, in this order.

When monochromic characters or images are to be printed, the processing liquid S is applied and then the Bk ink is applied. Then, the respective C', M' and Y' inks of high penetrability are applied while their application is thinned out. Color images may be printed by the same procedure as that for Embodiment 2.

(Embodiment 5)

This embodiment is directed to a modification of Embodiment 4, where the C', M' and Y' inks of light color have the same polarity as the processing liquid S.

More specifically, each embodiment described above use the cationic processing liquid and anionic Bk, C, M, Y, C', M' and Y' inks. On the other hand, this embodiment uses cationic C', M' and Y' inks, i.e., having the same polarity as the processing liquid.

In this case, when monochromic characters or images are to be printed, the cationic processing liquid is applied and then the anionic Bk ink is applied. Then, the respective cationic C', M' and Y' inks of high penetrability are applied. When color images, e. g. respective cyan, magenta, and yellow color images are to be printed, respective combinations (S, C, C'), (S, M, M') and (S, Y, Y') are used and in each combination, the processing liquid and inks are applied in the above described order. In this case, the C, M and Y inks are anionic, and S, C', M' and Y' are cationic.

As described above, the anionic ink of relatively high density is applied so that the anionic ink is sandwiched between the processing liquid and another ink, both of opposite polarity, in the case of printing both monochromic and color images. As a result, each of the Bk, C, M and Y inks of high density reacts with both the cationic ink positioned above and the cationic processing liquid positioned below so that higher density of the printed image can be obtained.

No processing liquid is applied when light cyan, magenta or yellow color of image is to be printed.

As the above described embodiment, the printing system that applies the ink onto the processing liquid (both the ink and the processing liquid being low in penetrability) to insolubilize the colorant in the ink, and then applies the other ink of the same color but opposite polarity (the second ink being lower in density and higher in penetrability than the one applied before) is preferable, because high OD, sharp image edges, better strike-through property and high-speed fixation can be realized.

(Embodiment 6)

This embodiment is directed to a modification of Embodiment 5, where the processing liquid has a moderately high penetrability or is said to be "semi-penetrative", as described later. Thereby, use of such a processing liquid can improve fixability of ink without being accompanied by excessively degraded OD of a printed image.

It should be noted that in each of the above described embodiments application of ink is thinned out. However, the processing liquid may also be thinned out with respect to the application of ink.

Further, dye or pigment is used for the ink colorant in the above described embodiments. Use of a pigment as an ink colorant which has an opposite polarity to the processing liquid to be acceleratory solidified, promotes the solidification and fixing of the insolubilized substance in a relatively shallow surface layer of the printing medium, to increase image OD.

The above described embodiments are more specifically described by Examples, by referring to the attached figures.

Examples of the above-described embodiments will be discussed by referring to the accompanying drawings.

FIG. 1 is a view generally showing a structure of a full-line type printer according to a first example of the present invention, the structure corresponds to the configuration of Embodiment 1.

The printer 1 adopts an ink printing method where a plurality of full-line type printing heads are arranged along a printing medium conveyed direction (shown by arrow A in the figure) and eject an ink or processing liquid to perform printing. Such printing operations are controlled by a control circuit (not shown).

Printing heads 101Bk, 101S, 101C, 101M and 101Y, which make up a head group 101*g*, are respectively equipped with approximately 7200 ink ejection ports arranged in a width direction (perpendicular to the paper on which the figure is shown) of the printing medium conveyed in the arrow A direction to be capable of printing A3-size medium at the largest.

The printing paper 103 is conveyed in the arrow A direction by a pair of resist rolls 114 driven by a conveying motor and guided by a pair of guide plates 115 to take registration alignment of a top end of the printing paper, and conveyed by the conveying belt 111. The endless conveying belt 111 is supported by two rollers 112 and 113, and the vertical motion of the upper side of the belt is limited by a platen 104. The printing paper 103 is conveyed upon rotation driving of the roll 113, where the printing paper adheres to the belt 111 by means of electrostatic force. The rotation driving of the roller 113 is performed by a driving source, e.g., motor (which is not shown) so as to convey the printing paper 103 in the arrow A direction. The printing paper 103 is subjected to printing by means of the head group 101*g*, while the printing paper is conveyed with the conveying belt 111, and then discharged onto a stacker 116.

The head group 101*g* includes the head 101Bk ejecting the black (Bk) ink and the head 101S ejecting the processing liquid described in Embodiment 1, and further includes the heads for color inks (101C for cyan, 101M for magenta and 101Y for yellow). These heads are arranged in the direction A in which the printing paper 103 is conveyed, as shown in FIG. 1. These printing heads eject color inks and the processing liquid to print black and color images.

In this example, as the black ink ejected from the head 101Bk and the processing liquid ejected from the head 101S, the ink or the processing liquid having a characteristic of low penetration speed (hereinafter referred to as up remaining ink) is used as described in Embodiment 1. As the respective color cyan, magenta, and yellow inks which are respectively ejected from heads 101S, 101C, 101M and 101Y, ink having a higher penetration speed (hereinafter referred to as penetrative inks) is used.

The penetration speed will be described below.

It is known that when penetrability of the processing liquid and ink (hereinafter referred to simply as liquid) is represented by e.g. a penetrated liquid amount V per 1 $m^2$, the penetrated liquid amount V ($ml/m^2=\mu m$) is expressed by Bristow equation as a function of time (t) elapsing after a liquid droplet is ejected.

$$V=Vr+Ka\ (t-tw)^{1/2}$$

where, Lt>tw.

The liquid droplet is mostly absorbed by the irregularities on the printing paper (roughened portion on the paper), immediately after it lands on the paper, few penetrating inward. This time span for the absorption is represented by tw (wet time), and quantity of the liquid absorbed by the surface irregularities by Vr. When time (t) after the droplets reach the paper exceeds the time tw, the penetrated liquid amount V increases in proportion to the 1/2th order of the exceeded time span (t−tw). Ka is a proportional coefficient of the increase of the penetrated liquid amount, varying with the penetration speed of the liquid. It is hereinafter referred to as penetration coefficient.

Figure 2:
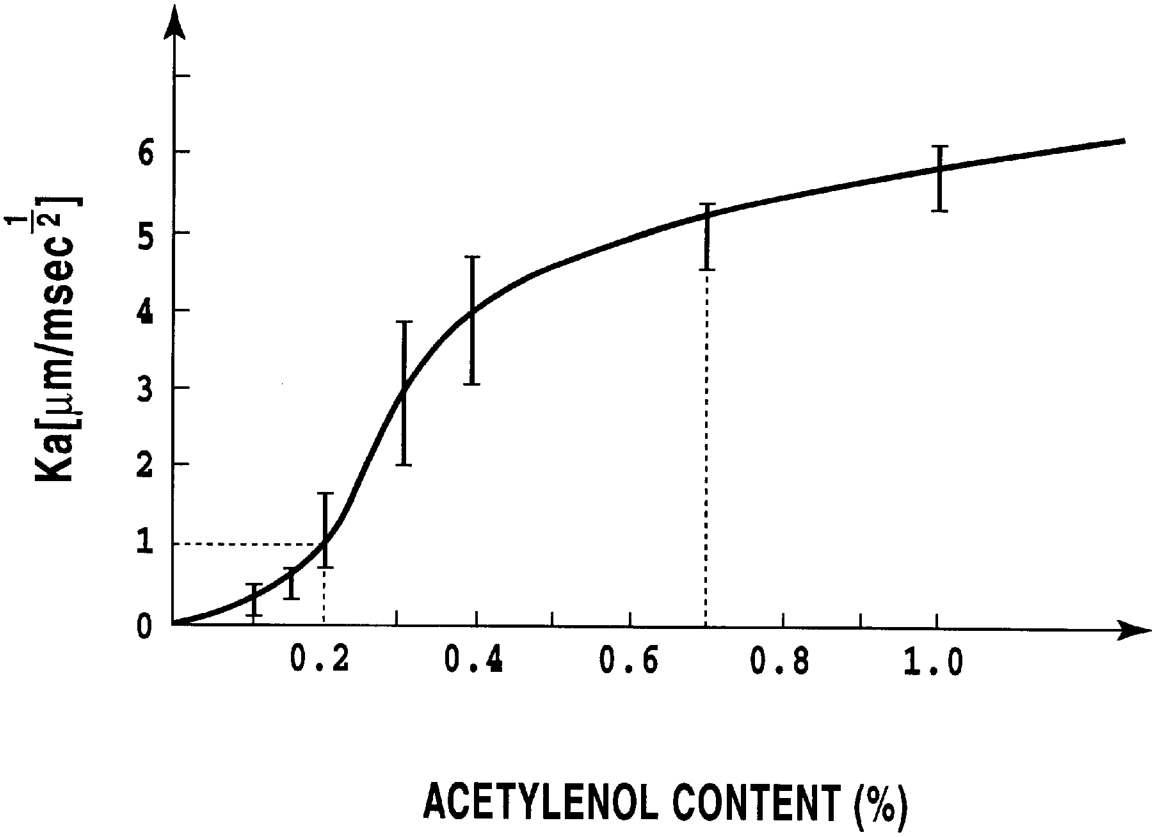
FIG. 2 a graph showing a relationship between a Ka value representing penetrability and an acetylenol content for the example.

FIG. 2 shows an empirical relationship between the penetration coefficient Ka and acetylenol (ethlene oxide-2, 4,7,9-tetramethyl-5-decyne-4,7 diol, manufactured by Kawaken Fine Chemicals Co., Ltd.) content in the liquid.

The Ka value is measured by a dynamic liquid penetrability tester S (manufactured by Toyo Seiki Seisaku-sho, Ltd.), based on Bristow method. The printing paper used in this test was PB paper (produced by Canon Inc. as the assignee of the present invention), which can be used for printing both by an electrographic device (e.g., a copy machine and laser beam printer) and an ink-jet printer.

Similar results are observed for PPC paper (also produced by Canon Inc.).

As shown in FIG. 2, a curved line shows that the Ka value (the ordinate axis) increases as the acetylenol content (the abscissa axis) increases and the former is determined by the latter, by which is meant that penetration speed of the ink (liquid) is essentially determined by its acetylenol content. The short lines crossing the curved line and parallel to the ordinate axis in the figure represent fluctuation ranges of the experimental data.

Figure 3A:
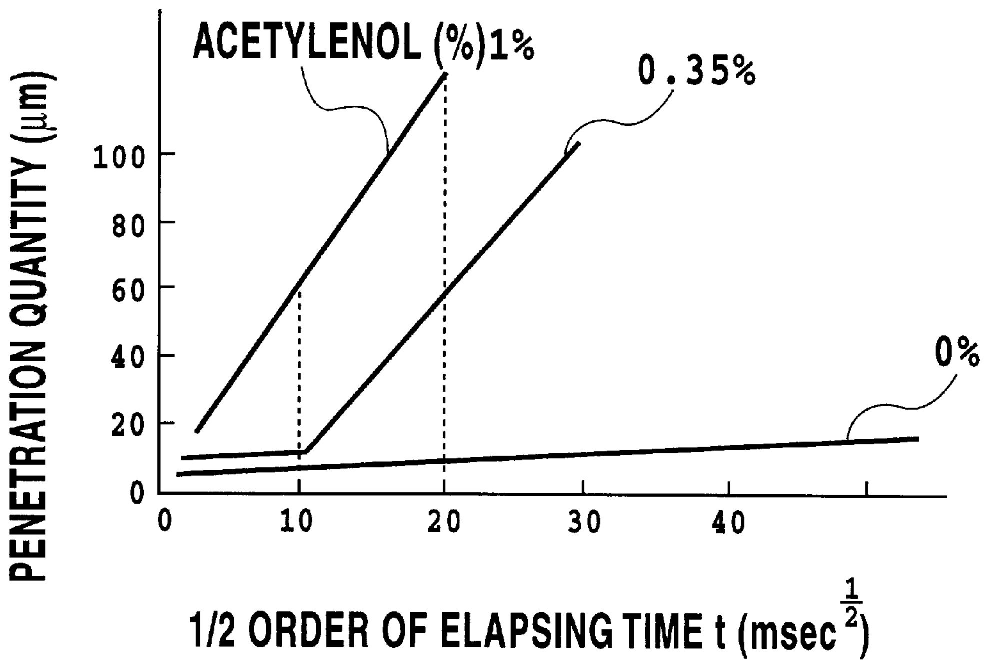
FIGS. 3A and 3B are graphs showing a relationship between a penetration rate and elapsed time after ink reaches the printing medium, for each acetylenol content representing penetrability as a parameter.
Figure 3B:
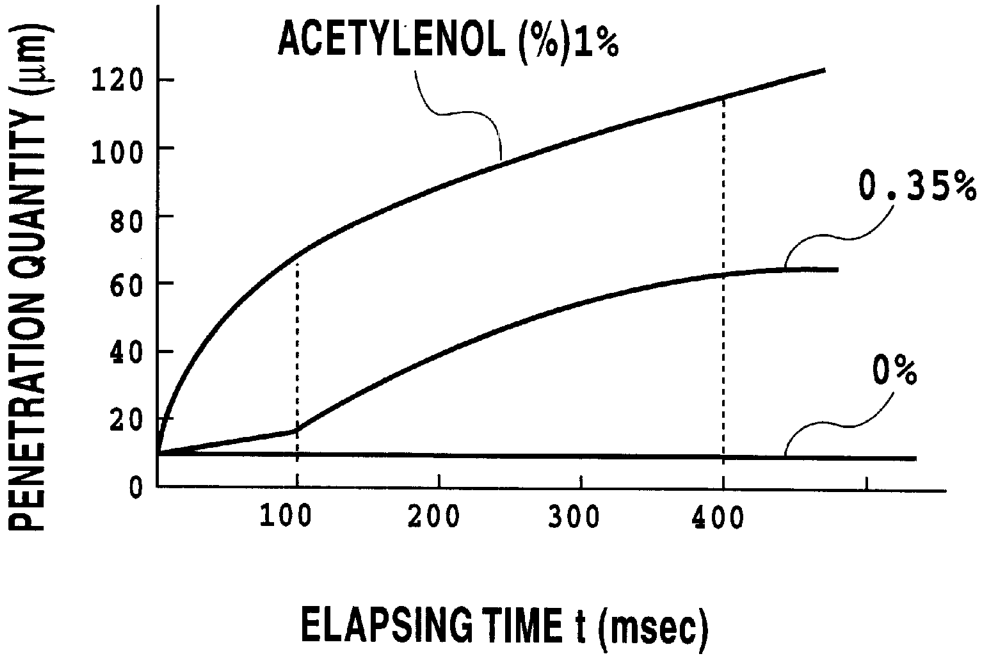

FIGS. 3A and 3B show a relationship between the penetrated liquid amount and the time after the ink reaches the printing paper, and show a result obtained by an experiment where the printing paper (PB paper) having a weight of 64 $g/m^2$, thickness of approximately 80 μm and void volume of approximately 50% is used.

The abscissa axis in FIG. 3A represents the 1/2 order of the elapsing time (t) ($msec^{1/2}$), whereas that in FIG. 3B represents the elapsing time (t)(msec). The ordinate axis in these figures represents the penetrated liquid amount V (μm). These figures show curved lines with respective acetylenol content 0%, 0.35% and 1% as parameters.

As apparent from these figures, the penetrated liquid amount at a given elapsing time increases and the liquid becomes more penetrative as the acetylenol content increases. Also, these figures show the general trends that the wet time (tw) decreases as the acetylenol content increases and penetrability also increases as the acetylenol content increases, even when the elapsing time does not reach the wet time.

The liquid free of the acetylenol (acetylenol content is 0%) is low in penetrability and has a character of the up remaining ink, defined later. On the other hand, the liquid containing 1% of acetylenol quickly penetrates into the printing paper 103 and has a character of the penetrative ink, also defined later. The liquid containing 0.35% of acetylenol has a character intermediate between the two (semi-penetrative ink).

Table 1 summarizes the characteristics or definitions of the up remaining ink(liquid), penetrative ink(liquid) and semi-penetrative ink(liquid).

TABLE 1

| | Ka value ($ml/m^2 \cdot msec^{1/2}$) | Acetylenol content (%) | Surface tension (dyne/cm) |
|---|---|---|---|
| Up remaining ink | Less than 1.0 | Less than 0.2 | 40 or more |
| Semi-penetrative ink | 1.0 or more but less than 5.0 | 0.2 or more but less than 0.7 | 35 or more but less than 40 |
| Penetrative ink | 5.0 or more | 0.7 or more | Less than 35 |

Table 1 shows the Ka value, the acetylenol content (%) and surface tension (dyne/cm) of the up remaining, semi-penetrative and penetrative liquids, used as the ink or processing liquid. Penetrability of these liquids into the printing paper (printing medium) increases as the Ka value increases. In other words, it increases as surface tension decreases.

The Ka value shown in Table 1 was measured by a dynamic liquid penetrability tester S (manufactured by Toyo Seiki Seisaku-sho, Ltd.), based on the Bristow method. The printing paper used in this test was PB paper (produced by Canon Inc. as the assignee of the present invention). Similar results were observed with PPC paper (also produced by Canon Inc.).

Critical micelle concentration (CMC) of a surfactant in a liquid is known to be one of the conditions under which the surfactant is dissolved in the liquid. This concentration is the critical level at which a number of molecules are rapidly associated with one other to form a micelle when concentration of a surfactant-containing solution increases. Acetylenol, used to adjust penetrability of the liquid, is one type of surfactant and should similarly have the critical micelle concentration according to the liquid.

As characteristics of a relationship between surface tension and the acetylenol content, it is known that surface tension of a liquid no longer decreases when its acetylenol content increases as it begins to form the micelle. From this, it is confirmed that critical micelle concentration (CMC) of acetylenol for a water is approximately 0.7%.

The liquids shown in Table 1 are viewed from critical micelle concentration (CMC). Taking the penetrative ink as an example, it contains acetylenol at a content higher than its CMC with water.

The processing liquid and inks for this example had the following compositions, where the content of each component is shown by parts by weight.

| | |
|---|---|
| [Processing liquid] | |
| Glycerin | 7 parts |
| Diethylene glycol | 5 parts |
| Polyaryl amine (molecular weight: 1500 or less, average molecular weight: approximately 1000) | 4 parts |
| Acetic acid | 4 parts |
| Water | Balance |
| [Yellow (Y) Ink] | |
| C. I. direct yellow 86 | 3 parts |
| Glycerin | 5 parts |
| Diethylene glycol | 5 parts |
| Acetylenol EH (manufactured by Kawaken Fine Chemicals Co., Ltd.) | 3 part |
| Water | Balance |
| [Magenta (M) Ink] | |
| C. I. acid red 289 | 3 parts |
| Glycerin | 5 parts |
| Diethylene glycol | 5 parts |
| Acetylenol EH (manufactured by Kawaken Fine Chemicals Co., Ltd.) | 1 part |
| Water | Balance |
| [Cyan (C) Ink] | |
| C. I. direct blue 199 | 3 parts |
| Glycerin | 5 parts |
| Diethylene glycol | 5 parts |
| Acetylenol EH (manufactured by Kawaken Fine Chemicals Co., Ltd.) | 1 part |
| Water | Balance |
| [Black (Bk) Ink] | |
| Pigment dispersant solution | 25 parts |
| Food black 2 | 2 parts |
| Glycerin | 6 parts |
| Diethylene glycol | 5 parts |
| Acetylenol EH (manufactured by Kawaken Fine Chemicals Co., Ltd.) | 0.2 part |
| Water | Balance |

The pigment dispersant solution is described below:

[Pigment Dispersant Solution]

Concentrated hydrochloric acid (5 g of hydrogen chloride dissolved in 5.3 g of water) is incorporated with 1.58 g of anthranilic acid at 5° C. This solution is agitated in an ice bath to be kept at 10° C. or less, and incorporated with a solution comprising 1.78 g of sodium nitrite dissolved in 8.7 g of water at 5° C. The solution is further agitated for 15 min, to which 20 g of as-mixed carbon black (specific surface area: 320 $m^2/g$, and DBP oil absorptivity; 120 ml/100 g) is added. The mixture is further agitated for 15 min. and the resultant slurry is filtered by Filter No. 2 (manufactured by Toyo Roshi Kaisha, Ltd. of Advantec Group). Then, the pigment particles are sufficiently washed with water, dried at 110° C. in an oven, and then mixed with water to prepare a 10 wt. % aqueous solution of the pigment. The pigment dispersant solution thus prepared is dispersed with self-dispersing type carbon black, anionically charged with the hydrophilic group bonded to the carbon black particle surfaces via phenyl group.

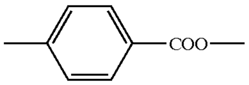

As indicated by the above compositions, the processing liquid and the Bk ink are set as the up remaining liquid or ink, and the C, M and Y inks as the penetrative inks, according to their acetylenol contents.

The black ink uses a dispersant-free pigment, i.e., contains no dispersant, as described in the above embodiments. This ink suitably uses self-dispersing type, anionic carbon black, in which at least one type of hydrophilic group is bonded to the carbon black particle surfaces directly or via another type of atomic group. The self-dispersing type carbon black is preferably ionic, more preferably anionically charged.

The examples of anionically charged carbon black types have a surface-bonded hydrophilic group, such as —COOM, —$SO_3M$, —$PO_3HM$, —$PO_3M_2$, —$SO_2NH_2$, or —$SO_2NHCOR$ (M is hydrogen, an alkaline metal, ammonium or organic ammonium; and R is an alkyl, phenyl which may be substituted or naphtyl which may be substituted, having a carbon number of 1 to 12). The particularly suitable carbon black types for this example are anionically charged ones, with —COOM or —$SO_3M$ bonded to the carbon black particle surfaces.

The alkaline metal M in the hydrophilic group includes lithium, sodium and potassium, and the organic ammonium includes mono- and tri-methylammonium, mono- and tri-ethylammonium, and mono- and tri-methanolammonium. The anionically charged carbon black may be obtained by introducing —COONa to the carbon black particle surfaces, e.g., by oxidation-treating carbon black with sodium hypochlorite. It is needless to say that the method is not limited to the above.

It is preferable for the present example to use carbon black with a hydrophilic group bonded to the particle surfaces via another atomic group. Such atomic groups include an alkyl group, phenyl group which may be substituted and naphtyl group which may be substituted, having a carbon number of 1 to 12. The hydrophilic groups bonded to carbon black particle surfaces via another atomic group include, in addition to the above, —$C_2H_4COOM$, —$PhSO_3M$ and —PhCOOM (Ph is phenyl group), although not limited thereto, needless to say.

The carbon black as the dispersant-free pigment is itself more dispersible in water than the conventional carbon black, thus dispensing with pigment-dispersed resin or surfactant. This brings about various advantages, e.g., higher in adhesion and wettability than the conventional one, and hence excellent in reliability when handled by a printing head.

In this example, the ink ejection ports of each printing head are arranged at a density of 600 dpi, and printing is performed at a dot density of 600 dpi in the printing paper conveying direction. As a result, the image or the like printed in this example has a dot density of 600 dpi both in row and column directions. Further, each head ejects the liquid at a frequency of 4 kHz. Accordingly, the printing paper is conveyed at a rate of approximately 170 mm/sec. The Bk ink head 101Bk is 40 mm apart from the processing liquid head 101S (distance D in FIG. 1), which translates into approximately 0.24 sec as time interval required for ejecting the Bk ink after the processing liquid.

Figure 4:
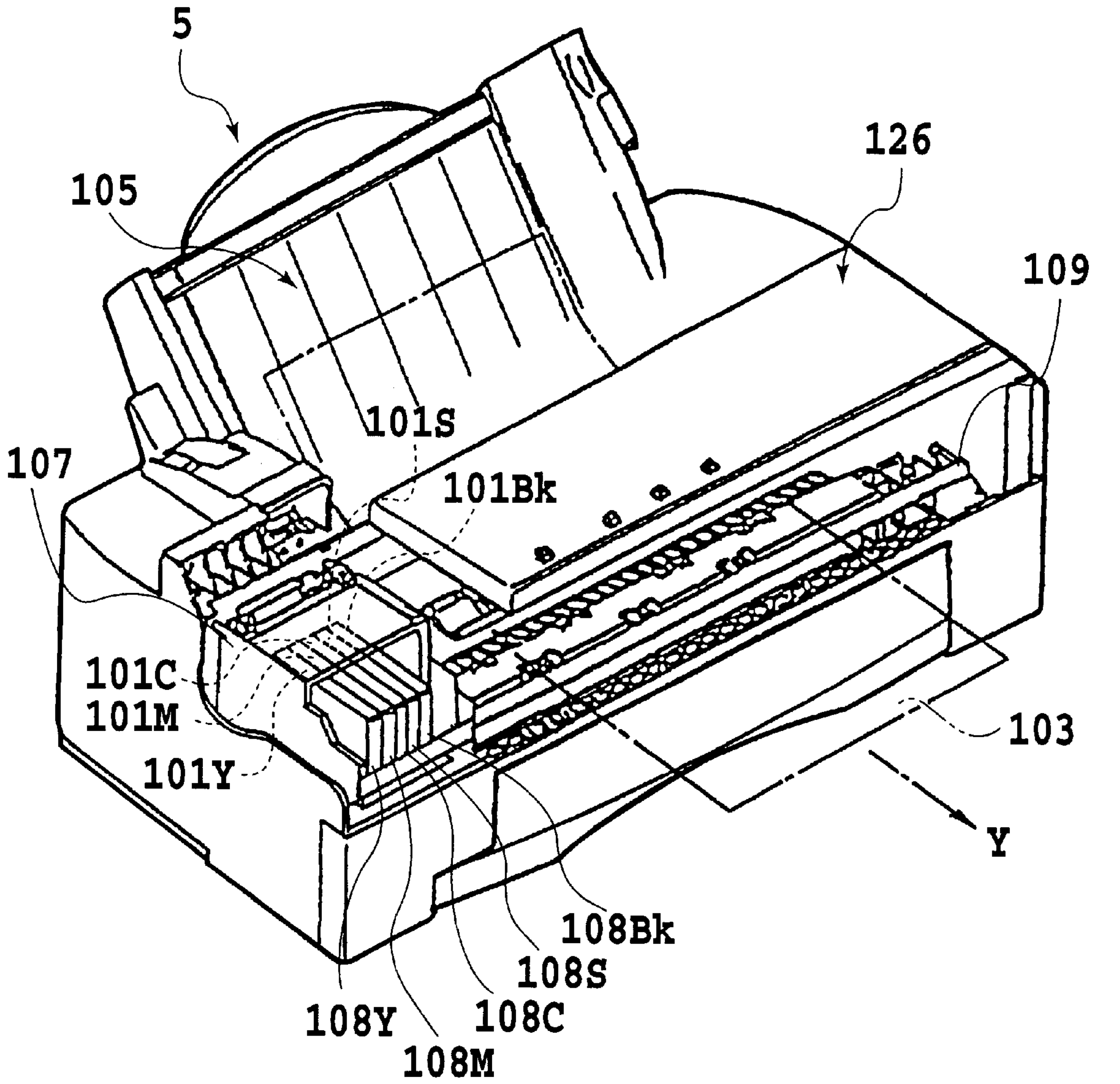
FIG. 4 is a perspective view generally showing a serial printer of another example of the present invention.

FIG. 4 is a perspective view showing an outline of a serial type printer 5 according to another example of the present invention. It is apparent that the printer, which ejects the Bk ink to react it with the processing liquid ejected onto the printing medium previously, is applicable not only to the above-mentioned full-line type but also to a serial type printer. The same elements in FIG. 4 as those in FIG. 1 are marked with the same reference signs.

The printing paper 103 as the printing medium is inserted into the printer at a paper supply section 105, moves through a printing section 126 and is discharged from the printer. This example uses common, inexpensive paper as the printing paper 103. A carriage 107 in the printing section 126 mounts printing heads 101Bk, 101S, 101C, 101 M and 101Y and is adapted to move in both directions along the guide rail 109 by means of driving force provided by a motor (not shown). The printing head 101S can eject the processing liquid described in the above-mentioned embodiments. The printing heads 101Bk, 101C, 101M and 101Y are driven to eject the black, cyan, magenta and yellow inks, respectively. More specifically, the processing liquid is ejected after the Bk ink is ejected and then the cyan, magenta and yellow inks are ejected in this order, onto the printing paper 103.

The processing liquid and inks are supplied from respective ink tanks 108Bk, 108S, 108C, 108M and 108Y. An electro-thermal converting element (heater) is provided for each ejection port of the head and is subjected to an electrical signal to generate thermal energy when the processing liquid or the ink is ejected. The thermal energy generates a bubble in the processing liquid or the ink to eject the processing liquid or the ink by means of pressure of the bubble. Each head is provided with a total of 64 ejection ports at a density of 360 dpi, which are arranged almost parallel to the conveying direction Y of the printing paper 103, or in the direction almost perpendicular to the head scanning direction. An ejection amount for each ejection port can be realized as the amount described in any one of the preceding embodiments.

The heads in this printer are ½ inch apart from each other. Accordingly, a distance between the heads 101S and 101Bk is ½ inch. Further, since a printing density is 720 dpi in the scanning direction and an ejection frequency is 7.2 kHz at each head, a time interval required for ejecting the Bk ink from the head 101*bk* after the processing liquid is ejected from the head 101*s* is 0.05 sec.

It should be noted that an arranged order of the cyan, magenta and yellow heads 101C, 101M, 101Y is not limited to an arrangement described above. The order may be one selected from orders obtained from a permutation of these cyan, magenta and yellow heads. This is the same as in following examples.

EXAMPLE 2

Figure 5:
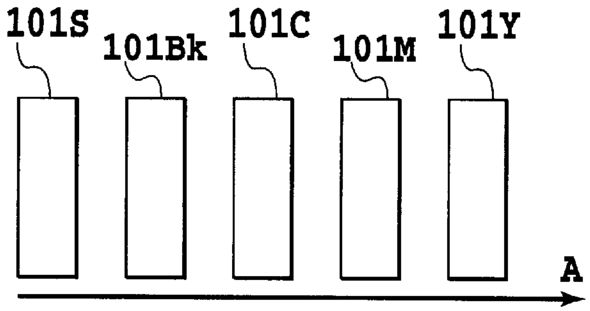
FIG. 5 is a schematic view showing a printing head arrangement of a first embodiment of the present invention.

FIG. 5 is a view generally showing an arrangement of printing heads according to this example, which corresponds to the above-described Embodiment 3.

The printing heads for this example are of full-line type, similar to those shown in FIG. 1. The heads 101S, 101Bk, 101C, 101M and 101Y are arranged, in this order, along the printing medium conveying direction A.

EXAMPLE 3

Figure 6:
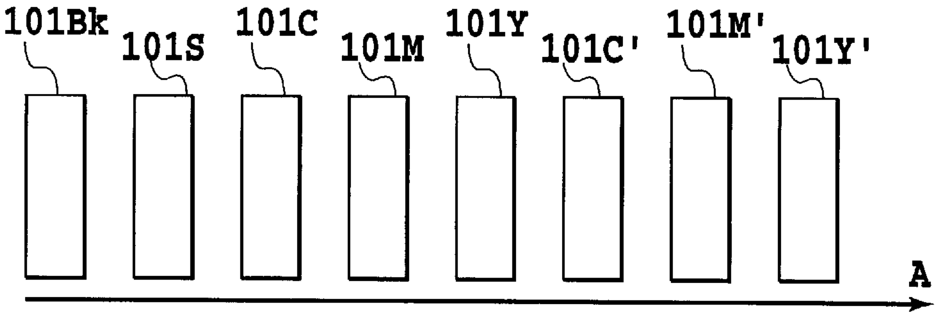
FIG. 6 is a schematic view showing a printing head arrangement of a second embodiment of the present invention.

FIG. 6 is a view, like FIG. 5, generally showing only an arrangement of printing heads according to this example, which corresponds to the above-described Embodiment 2.

The printing heads for this example are similarly of full-line type, where the heads 101Bk, 101S, 101C, 101M, 101Y, 101C', 101M' and 101Y' are arranged, in this order, along the printing medium conveying direction A.

The heads 101C', 101M' and 101Y' eject the C', M' and Y' inks, respectively, with compositions similar to those of the C, M and Y inks, but different in that their dye concentrations are adjusted at the range of 1/3 to 1/6 of those in the C, M and Y inks, and their acetylenol EH content is set at 3 wt. %. The C, M and Y inks for this example contain acetylenol EH at 0.1 wt. %, and are therefor of low penetrability (the so-called up remaining type).

EXAMPLE 4

Figure 7:
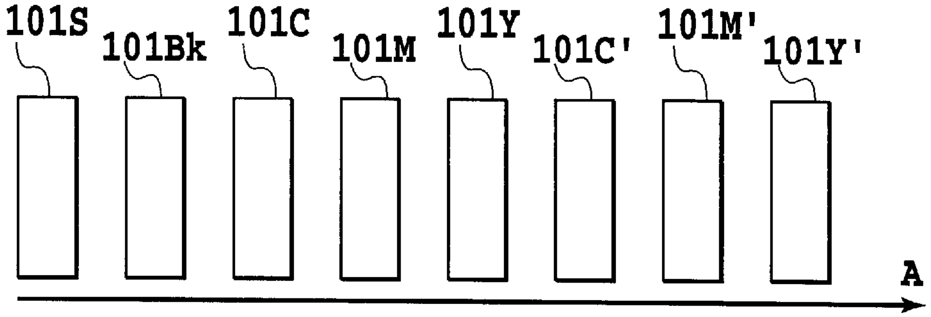
FIG. 7 is a schematic view showing a printing head arrangement of a third embodiment of the present invention.

FIG. 7 is a view generally showing an arrangement of printing heads according to this example, which corresponds to the above-described Embodiment 4. As shown in FIG. 7, the printing heads for this example are of full-line type, where the heads 101S, 101Bk, 101C, 101M, 101Y, 101C', 101M' and 101Y' are arranged, in this order, along the printing medium conveying direction.

EXAMPLE 5

Figure 8:
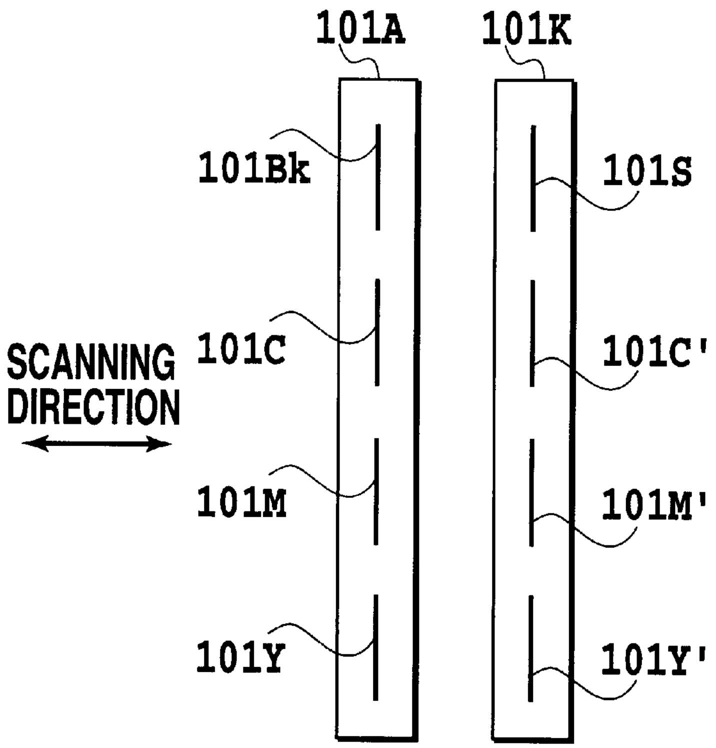
FIG. 8 is a schematic view showing a printing head arrangement of a fourth embodiment of the present invention.

FIG. 8 is a view generally showing an arrangement of printing heads according to this example, which corresponds to the above-described Embodiment 5 and its modification. These heads are of serial type.

A head 101A is provided with ejection sections 101Bk, 101C, 101M and 101Y ejecting the anionic Bk, C, M and Y inks respectively, while a head 101K is provided with ejection sections 101S, 101C', 101M' and 101Y' ejecting the processing liquid, and C', M' and Y' inks, respectively, all cationic. Each ejection section is provided with a total of 64 ink ejection ports, arranged at predetermined intervals in each head.

The head 101A and 101K are mounted on a carriage, such as that shown in FIG. 4, and scanned in an arrowed direction shown in FIG. 8. During forward and backward scanning, the inks or the processing liquid are ejected from the ejection sections in each head in the order described in the above-described Embodiment 5. When monochromic characters or images are to be printed, for example, the ejection section 101S in the head 101K ejects the cationic processing liquid in the first forward scanning, and then the ejection section 101Bk in the head 101A ejects the anionic Bk ink in the backward direction, for each pixel for forming the characters or images. Next, after the printing medium is conveyed for a given amount, the ejection section 101C' in the head 101K ejects the C' ink while the forward direction. This procedure of conveying the printing medium and the forward scanning operation are accompanied by an ejecting operation of the M' ink and the Y' ink in this order.

When a color image is to be printed, on the other hand, the ejection section 101S in the head 101K ejects the cationic processing liquid while scanned in the forward direction for each pixel for forming the color image, and then the C and C' inks, for example, are ejected during forward scanning after the printing medium is conveyed a given distance for each pixel to form the color image.

Furthermore, when printing monochromic characters or images, the Bk ink and processing liquid may be ejected in this order in the first forward scanning, followed by ejecting the C' ink, and similarly M' and Y' inks after the printing medium is conveyed for a given distance.

The Bk, C, M and Y inks for this example are similar to those described in the above-described Example 1. The cationic C', M' and Y' inks have the following compositions.

The solvent for each ink has the following compositions;

| | |
|---|---|
| Polyaryl amine (molecular weight: 1500 or less, average molecular weight: approximately 1000) | 4% |
| Acetic acid | 4% |
| Benzalconium chloride | 0.5% |
| Acetylenol EH | 3% |
| Glycerin | 7% |
| Diethylene glycol | 5% |
| Water | Balance |

For the dye for each cationic ink, BB100 (basic blue 100) is used for the C' ink contained at 0.4%, which may be replaced by the same content of BB47 (basic blue 47) 0.4%, and BR12 (basic red 12) and BY29 (basic yellow 29) are used for the M' and Y' inks, respectively.

It should be noted that respective arranged orders of cyan, magenta and yellow sections and light cyan, light magenta and light yellow sections are not limited to the orders shown in FIG. 8. The orders may be ones among orders obtained from respective permutations of the cyan, magenta and yellow sections and the light cyan, light magenta and light yellow sections. Further, two heads shown in FIG. 8 may be integrated with each other to form one head, as in the following example.

EXAMPLE 6

Figure 9:
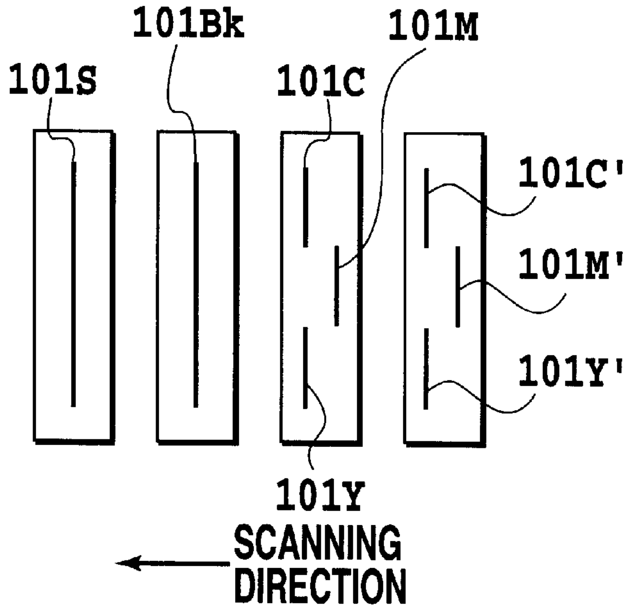
FIG. 9 is a schematic view showing a printing head arrangement of a fifth embodiment of the present invention.

FIG. 9 is a view generally showing a printing head configuration of this example, which corresponds to the above-described Embodiment 4 or 5.

In this example, the four heads shown in the figure are mounted on a carriage to be scanned in the arrowed direction and the printing medium is conveyed for a predetermined distance. Printing is performed by repeatedly scanning the heads and conveying the printing medium. More concretely, printing can be performed by executing each of monochromic and color modes.

For the monochromic mode, all of the ejection ports in each head are used for one scanning path, where printing corresponds to the maximum width of each head (i.e., a width over all ejection ports arranged in ejection sections 101S and 101B). More specifically, the processing liquid is first ejected from the ejection section 101S, and then the Bk ink is ejected from the ejection section 101Bk. This is followed by ejecting the respective C', M' and Y' inks from the respective ejection sections 101C', 101M' and 101Y' onto an area where the processing liquid and Bk ink have previously been ejected, to print monochromic characters or images.

For the color mode, on the other hand, the maximum paper conveying amount is set at the width extending over all ejection ports in the ejection section, e.g., 101C, scanning the heads in the arrowed direction shown in the figure and conveying the printing medium at the above-stated amount, are repeated to print a color image. When an image of cyan color is to be printed, for example, the processing liquid S is first ejected from the ejection section 101S, and then the C and C' inks are ejected, in this order, from the respective ejection sections 101C and 101C'.

Tables 2 and 3 give two examples showing sets of acetylenol content in the processing liquid and the respective inks, printing duty of the processing liquid and respective inks for printing respective monochromic and color images.

TABLE 2

| | Processing liquid | Bk ink | Color (C, M or Y) ink | Color (C', M' or Y') ink of light tone |
|---|---|---|---|---|
| Acetylenol content (%) | 0 | 0.2 | 0.1 | 3.2 |
| Ejection amount (p1) | 15 | 25 | 15 | 15 |
| | Printing duty | | | |
| Monochromic printing | ½ | 1 | | ½ |
| Color printing | ½ | | 1 | ½ |

TABLE 3

| | Processing liquid | Bk ink | Color (C, M or Y) ink | Color (C', M' or Y') ink of light tone |
|---|---|---|---|---|
| Acetylenol content (%) | 0 | 0.2 | 0.1 | 3.0 |
| Ejection amount (p1) | 15 | 30 | 15 | 18 |
| | Printing duty | | | |
| Monochromic printing | ½ | 1 | | ½ |
| Color printing | ½ | | 1 | ½ |

In the two examples shown in the Tables 2 and 3, the final acetylenol contents in the combined processing liquid and inks for the monochromic printing are 0.73 and 0.71%, respectively, in consideration of the given printing duty (thinning-out rate). The respective final acetylenol contents correspond to values greater than the critical micelle concentration (CMC) in water. This means that the combined liquid shows high penetrability.

As is apparent from the above description, according to each of the embodiments described above, after the first ink droplet containing the first colorant and the processing liquid droplet are mixed to react on the printing medium to form the secondary liquid, the second ink droplet of high penetrability containing the second colorant is applied onto the secondary liquid. Thereby, the first colorant can be accelaratory solidified on the surface of the printing medium in the presence of the processing liquid droplet and the first colorant becomes a large block, at the molecular level, on the printing medium. Then, since the second ink droplet of high penetrability is applied onto the block, an aqueous solvent for the ink can penetrate quickly while leaving the colorant on the printing medium surface.

As a result, printing of high density and high-speed fixation can be realized both for monochromic and color printing.

The present invention has been described in detail with respect to preferred embodiments, and it will now be apparent from the foregoing to those skilled in the art that changes and modifications may be made without departing from the invention in its broader aspect. The invention, therefore, is not limited to the recited claims but is intended to cover all changes and modifications that fall within the true spirit of the invention.

What is claimed is:

1. An ink printing method using at least three types of liquid droplets, comprising the steps of:

causing a first ink droplet containing a first colorant to mix and react with a processing liquid droplet, which works to accelerate solidification of the first colorant, on a printing medium to form a secondary liquid which contains a non-ionic surfactant having a concentration below its critical micelle concentration (CMC) in water; and applying a second ink droplet onto the secondary liquid, the second ink droplet containing a second colorant and a non-ionic surfactant having a concentration greater than or equal to its CMC in water.

2. An ink printing method as claimed in claim 1, wherein after the second ink droplet is combined with the secondary liquid, the combined solution contains non-ionic surfactant at a concentration greater than or equal to its CMC in water.

3. An ink printing method using at least three types of liquid droplets, comprising the steps of:

causing a first ink droplet containing a first colorant to mix and react with a processing liquid droplet, which works to accelerate solidification of the first colorant, on a printing medium to form a secondary liquid which has a Ka value below 5; and applying a second ink droplet onto the secondary liquid, the second ink droplet containing a second colorant and a non-ionic surfactant having a concentration greater than or equal to its CMC in water.

4. An ink printing method as claimed in claim 3, wherein after the second ink droplet is combined with the secondary liquid, the combined solution contains non-ionic surfactant at a concentration greater than or equal to its CMC in water.

5. An ink printing method as claimed in claim 1, wherein the second droplet is applied onto the secondary liquid in a substantially smaller amount than the first ink droplet.

6. An ink printing method as claimed in claim 1, wherein the second colorant for the second ink droplet is similar in color to the first colorant for the first ink droplet and the second ink droplet contains the first colorant at a lower concentration than the first ink droplet contains the first colorant.

7. An ink printing method as claimed in claim 1, wherein the second ink droplet has a polarity opposite to that of the first ink droplet.

8. An ink printing method as claimed in claim 1, wherein the processing liquid is applied to the first ink droplet in a substantially smaller amount than the first ink droplet.

9. An ink printing method as claimed in claim 1, wherein the first colorant for the first ink droplet is a pigment.

10. An ink printing apparatus which uses a head ejecting at least three types of liquid droplets and ejects the liquid droplets from the head onto a printing medium to perform printing, said apparatus comprising:

first applying means for controlling ejection of the liquid from the head so as to cause a first ink droplet containing a first colorant to mix and react with a processing liquid droplet, which works to accelerate solidification of the first colorant, on the printing medium to form a secondary liquid which contains a non-ionic surfactant having a concentration below its critical micelle concentration (CMC) in water; and second applying means for controlling ejection of the liquid from the head to apply a second ink droplet onto the secondary liquid, the second ink droplet containing a second colorant and a non-ionic surfactant having a concentration greater than or equal to its CMC in water.

11. An ink printing apparatus as claimed in claim 10, wherein after the second ink droplet is combined with the secondary liquid, the combined solution contains non-ionic surfactant at a concentration greater than or equal to its CMC in water.

12. An ink printing apparatus which uses a head ejecting at least three types of liquid droplets and ejects the liquid droplets from the head onto a printing medium to perform printing, said apparatus comprising:

first applying means for controlling ejection of the liquid from the head so as to cause a first ink droplet containing a first colorant to mix and react with a processing liquid droplet, which works to accelerate solidification of the first colorant, on the printing medium to form a secondary liquid which has a Ka value below 5; and second applying means for applying a second ink droplet onto the secondary liquid, the second ink droplet containing a second colorant and a non-ionic surfactant having a concentration greater than or equal to its CMC in water.

13. An ink printing apparatus as claimed in claim 12, wherein after the second ink droplet is combined with the secondary liquid the combined solution contains the non-ionic surfactant at a concentration greater than or equal to its CMC in water.

14. An ink printing apparatus as claimed in claim 10, wherein the second droplet is applied onto the secondary liquid on the printing medium in an amount substantially smaller than the first ink droplet.

15. An ink printing apparatus as claimed in claim 10, wherein the second colorant for the second ink droplet is similar in color to the first colorant for the first ink droplet and the second ink droplet contains the first colorant at a lower concentration than the first ink droplet contains the first colorant.

16. An ink printing apparatus as claimed in claim 10, wherein the second ink droplet has a polarity opposite to that of the first ink droplet.

17. An ink printing apparatus as claimed in claim 10, wherein the processing liquid is applied to the first ink droplet in a substantially smaller amount than the first ink droplet.

18. An ink printing apparatus as claimed in claim 10, wherein the first colorant for the first ink droplet is a pigment.

19. An ink printing apparatus as claimed in claim 10, wherein the head generates a bubble in the liquid by utilizing thermal energy to eject the liquid by means of pressure from the bubble.

20. An ink printing apparatus as claimed in claim 10, wherein the head ejecting at least three types of liquid droplets includes a black head ejecting black ink as the first ink droplets, a processing liquid head ejecting the processing liquid and cyan, magenta and yellow heads ejecting cyan, magenta and yellow inks, respectively, as the second ink droplets, and wherein the heads are arranged in this order in a moving direction of the heads relative to the printing medium.

21. An ink printing apparatus as claimed in claim 10, wherein the head ejecting at least three types of liquid droplets includes black, cyan, magenta and yellow heads ejecting black, cyan, magenta and yellow inks, respectively, as the first ink droplets, a processing liquid head ejecting the processing liquid, and light cyan, light magenta and light yellow heads ejecting light cyan, light magenta and light yellow inks, respectively, as the second ink droplets, wherein the light cyan, light magenta and light yellow inks show lower density than the cyan, magenta and yellow inks, respectively, and wherein the black, processing liquid, cyan, magenta, yellow, light cyan, light magenta and light yellow heads are arranged in this order in a moving direction of the heads relative to the printing medium.

22. An ink printing apparatus as claimed in claim 10, wherein the head ejecting at least three types of liquid droplets includes a black head ejecting black ink as the first ink droplet, a processing liquid head ejecting the processing liquid, and cyan, magenta and yellow heads ejecting cyan, magenta and yellow inks, respectively, as the second ink droplets, and wherein the processing liquid, black, cyan, magenta and yellow heads are arranged in this order in a moving direction of the heads relative to the printing medium.

23. An ink printing apparatus as claimed in claim 10, wherein the head ejecting at least three types of liquid droplets includes black, cyan, magenta and yellow heads ejecting black, cyan, magenta and yellow inks, respectively, as the first ink droplets, a processing liquid head ejecting the processing liquid, and light cyan, light magenta and light yellow heads ejecting light cyan, light magenta and light yellow inks, respectively, as the second ink droplets, wherein the light cyan, light magenta and light yellow inks show lower density than the cyan, magenta and yellow inks, respectively, and wherein the processing liquid, black, cyan, magenta, yellow, light cyan, light magenta and light yellow heads are arranged in this order in a moving direction of the heads relative to the printing medium.

24. An ink printing apparatus as claimed in claim 10, wherein the head ejecting at least three types of liquid droplets is a head including black, cyan, magenta and yellow ejection portions ejecting black, cyan, magenta and yellow inks as the first ink droplets, a processing liquid portion ejecting the processing liquid, and light cyan, light magenta and light yellow ejection portions ejecting light cyan, light magenta and light yellow inks, respectively, as the second ink droplets, wherein the light cyan, light magenta and light yellow inks show lower density than the cyan, magenta and yellow inks, respectively, and wherein the head consists of a first part including the processing liquid ejection portion, the light cyan, light magenta and light yellow ejection portions arranged in this order in a direction perpendicular to a moving direction of the head relative to the printing medium, and a second part including black, cyan, magenta and yellow ejection portions arranged in this order also in the direction perpendicular to the moving direction of the head relative to the printing medium, the first and second parts being arranged in the moving direction relative to one another.

25. An ink printing apparatus as claimed in claim 10, wherein the head ejecting at least three types of liquid droplets is a head including black, cyan, magenta and yellow ejection portions ejecting black, cyan, magenta and yellow inks as the first ink droplets, a processing liquid portion ejecting the processing liquid, and light cyan, light magenta and light yellow ejection portions ejecting light cyan, light magenta and light yellow inks, respectively, as the second ink droplets, wherein the light cyan, light magenta and light yellow inks show lower density than the cyan, magenta and yellow inks, respectively, and wherein said head consists of a first part including the processing ejection portion, a second part including the black ejection portion, a third part arranging cyan, magenta and yellow ejection portions in this order in a direction perpendicular to a moving direction of the portions relative to the printing medium, and a fourth part arranging the light cyan, light magenta and light yellow ejection portions in this order in the direction perpendicular to the moving direction, the four parts being arranged in the moving direction relative to one another.

26. A head which is adapted to be used for an ink printing apparatus as claimed in claim 10 and ejects at least three types of liquid droplets, said head including:

a black head ejecting black ink as the first ink droplets;

a processing liquid head ejecting the processing liquid; and cyan, magenta and yellow heads ejecting cyan, magenta and yellow inks, respectively, as the second ink droplets, wherein the black head, the processing liquid head, and a group of cyan, magenta and yellow heads are arranged in this order in a moving direction of the heads relative to the printing medium, wherein an arranged order of the cyan, magenta and yellow heads in the moving direction in the group is one order among orders obtained from a permutation of the cyan, magenta and yellow heads.

27. A head which is adapted to be used for an ink printing apparatus as claimed in claim 10 and ejects at least three types of liquid droplets, said head including:

black, cyan, magenta and yellow heads ejecting black, cyan, magenta and yellow inks, respectively, as the first ink droplets;

a processing liquid head ejecting the processing liquid; and light cyan, light magenta and light yellow heads ejecting light cyan, light magenta and light yellow inks, respectively, as the second ink droplets, the light cyan, light magenta and light yellow inks showing lower density than the cyan, magenta and yellow inks, respectively, wherein the black head, the processing liquid head, a group of the cyan, magenta, and yellow heads, and a group of the light cyan, light magenta, and light yellow heads are arranged in this order in a moving direction of the heads relative to the printing medium, and wherein an arranged order of the light cyan, light magenta and light yellow heads in the moving direction in the group is one order among orders obtained from a permutation of the light cyan, light magenta and light yellow heads.

28. A head which is adapted to be used for an ink printing apparatus as claimed in claim 10 and ejects at least three types of liquid droplets, said head including:

a black head ejecting black ink as the first ink droplet;

a processing liquid head ejecting the processing liquid; and cyan, magenta and yellow heads ejecting cyan, magenta and yellow inks, respectively, as the second ink droplets, wherein the processing liquid head, the black head, and a group of the cyan, magenta and yellow heads are arranged in this order in a moving direction of the heads relative to the printing medium, and wherein an arranged order of the cyan, magenta and yellow heads in the moving direction in the group is one order among orders obtained from a permutation of the cyan, magenta and yellow heads.

29. A head which is adapted to be used for an ink printing apparatus as claimed in claim 10 and ejects at least three types of liquid droplets, said head including:

black, cyan, magenta and yellow heads ejecting black, cyan, magenta and yellow inks, respectively, as the first ink droplets;

a processing liquid head ejecting the processing liquid; and light cyan, light magenta and light yellow heads ejecting light cyan, light magenta and light yellow inks, respectively as the second ink droplets, the light cyan, light magenta and light yellow inks showing lower density than the cyan, magenta and yellow inks, respectively, wherein the processing liquid head, the black head, a group of the cyan, magenta, and yellow heads, a group of the light cyan, light magenta and light yellow heads are arranged in this order in a moving direction of the heads relative to the printing medium, and wherein an arranged order of the light cyan, light magenta and light yellow heads in the moving direction in the group is one order among orders obtained from a permutation of the light cyan, light magenta and light yellow heads.

30. A head which is adapted to be used for an ink printing apparatus as claimed in claim 10 and ejects at least three types of liquid droplets, said head including:

a first head portion having black, cyan, magenta and yellow ejection portions ejecting black, cyan, magenta and yellow inks as the first ink droplets; and a second head portion having a processing liquid portion ejecting the processing liquid, and light cyan, light magenta and light yellow ejection portions ejecting light cyan, light magenta and light yellow inks, respectively, as the second ink droplets, the light cyan, light magenta and light yellow inks showing lower density than the cyan, magenta and yellow inks, respectively, wherein said second head portion arranges the processing liquid ejection portion and a group of the light cyan, light magenta and light yellow ejection portions in a direction perpendicular to a moving direction of the head portions relative to the printing medium, said first head portion arranges the black ejection portion and a group of the cyan, magenta and yellow ejection portions in the direction perpendicular to the moving direction, and said first and second head portions are arranged in the moving direction, and wherein respective arranged orders of the light cyan, light magenta and light yellow portions in the group and the cyan, magenta and yellow portions in the group in the moving direction, respectively are two orders among orders obtained from respective permutations of the light cyan, light magenta and light yellow portions and the cyan, magenta and yellow portions.

31. A head which is adapted to be used for an ink printing apparatus as claimed in claim 10 and ejects at least three types of liquid droplets, said head including:

a first head portion having a processing liquid portion ejecting the processing liquid;

a second head portion having a black ejection portion ejecting black ink as the first ink droplets;

a third head portion having cyan, magenta and yellow ejection portions ejecting cyan, magenta and yellow inks, also as the first ink droplets; and a fourth head portion having light cyan, light magenta and light yellow ejection portions ejecting light cyan, light magenta and light yellow inks, respectively, as the second ink droplets, the light cyan, light magenta and light yellow inks showing lower density than the cyan, magenta and yellow inks, respectively, wherein said third head portion arranges the cyan, magenta and yellow ejection portions in a direction perpendicular to a moving direction of the head portions relative to the printing medium, said fourth head portion arranges the light cyan, light magenta and light yellow ejection portions in the direction perpendicular to the moving direction, and said first, second, third and fourth head portions are arranged in the moving direction relative to one another, and wherein respective arranged orders of the cyan, magenta and yellow portions in the group and the light cyan, light magenta and light yellow portions in the group in the moving direction, respectively are two orders among orders obtained from respective permutations of the cyan, magenta and yellow portions and the light cyan, light magenta and light yellow portions.

32. A head as claimed in claim 30, wherein the black, cyan, magenta and yellow inks ejected from said first head are anionic inks, respectively and the processing liquid, and the light cyan, light magenta and light yellow inks ejected from said second head are cationic liquid and inks, respectively.

33. A head as claimed in claim 31, wherein the black ink ejected from said second head and the cyan, magenta, and yellow inks ejected from said third head are anionic inks, respectively, and the processing liquid ejected from said first head and the light cyan, light magenta, and light yellow inks ejected from said fourth head are cationic liquid and inks, respectively.

* * * * *

UNITED STATES PATENT AND TRADEMARK OFFICE
CERTIFICATE OF CORRECTION

PATENT NO. : 6,471,348 B1
DATED : October 29, 2002
INVENTOR(S) : Noribumi Koitabashi It is certified that error appears in the above-identified patent and that said Letters Patent is hereby corrected as shown below:

Column 3,
Line 29, "FIG. 2 a" should read -- FIG. 2 is a --.

Column 4,
Line 59, "before." should read -- before. ¶ (Embodiment 2) --.

Column 5,
Line 42, "speed." should read -- speed. ¶ (Embodiment 3) --.

Column 10,
Line 2, "absorptivity;" should read -- absorptivity: --.

Column 11,
Line 59, "as in" should read -- as in the --.

Column 12,
Line 57, "while the" should read -- while in the --.

Column 13,
Line 9, "compositions;" should read -- composition: --.

Column 19,
Line 17, "a group" should read -- and a group --.

Signed and Sealed this

Twenty-fourth Day of June, 2003

JAMES E. ROGAN
*Director of the United States Patent and Trademark Office*